(12) United States Patent　　(10) Patent No.:　US 12,578,262 B2

Luther-Davies　　(45) Date of Patent:　Mar. 17, 2026

(54) SIMPLE ZERO-Q-TRANSFORMING (ZQT) MULTI-PASS CELLS FOR OPTICAL APPLICATIONS

(71) Applicant: Lastek Pty Ltd, Thebarton (AU)

(72) Inventor: Barry Luther-Davies, Tomakin (AU)

(73) Assignee: Lastek Pty Ltd, Thebarton (AU)

( * ) Notice: Subject to any disclaimer, the term of this patent is extended or adjusted under 35 U.S.C. 154(b) by 98 days.

(21) Appl. No.: 18/582,887

(22) Filed: Feb. 21, 2024

(65) Prior Publication Data

US 2024/0280471 A1　　Aug. 22, 2024

(30) Foreign Application Priority Data

Feb. 22, 2023　(AU) ................................ 2023900460

(51) Int. Cl.
*G01N 21/03*　　(2006.01)
(52) U.S. Cl.
CPC ....... *G01N 21/031* (2013.01); *G01N 21/0303* (2013.01)
(58) Field of Classification Search
CPC ............. G01N 21/031; G01N 21/0303; G02B 17/004; H04B 10/25137; H04B 10/70
See application file for complete search history.

(56) References Cited

U.S. PATENT DOCUMENTS

2021/0333683 A1 * 10/2021 Zaouter ...................... G02F 1/35
359/238
2023/0152663 A1 * 5/2023 Pronin .................. G02F 1/3503
359/346

OTHER PUBLICATIONS

Rode et al., Generation of third-harmonic radiation of IR picosecond lasers for Ultrafast Pulsed Laser Deposition, 2003, SPIE, vol. 5131, pp. 195-199 (Year: 2003).*
Luther-Davies et al., Table-top 50-W laser system for ultra-fast laser ablation, 2004, Applied Physics A, vol. 79, pp. 1051-1055 (Year: 2004).*
Sennaroglu and Fujimoto, Design criteria for Herriot-type multipass cavities for ultrashort pulses (Optics Express, vol. 11, pp. 1106-1113, 2003).
Kolev, Long-Optical-Resonator Passively Mode-Locked Laser Prototype for Ultra-Fast Pulsed Laser Ablation and Deposition Installation (PHD thesis, The Australian National University, 2003).

* cited by examiner

*Primary Examiner* — Michelle M Iacoletti
*Assistant Examiner* — Judy Dao Tran
(74) *Attorney, Agent, or Firm* — Sand. Sebolt & Wernow Co., LPA

(57) ABSTRACT

This invention comprises a Zero-Q-Transforming (ZQT) multi-pass cell (MPC) of a defined type, comprising a pair of concave high-reflectivity mirrors facing each other and separated by a specified distance. The defined cell is of the type such that the circulating beam forms a closed path inside the cell. A means of coupling light in and out of the cell is defined that uses a single mirror in an arrangement that delivers a beam to the output which has the same properties as the input beam and is aligned along the same path as the input beam. The defined coupling method allows the creation of an MPC where the exact path of the light inside the cell has no effect on the properties of the output beam making it highly tolerant of alignment.

10 Claims, 3 Drawing Sheets

$$f = r/2$$

○ Reflections from the MPC mirrors

□ Input and output reference planes

SIMPLE ZERO-Q-TRANSFORMING (ZQT) MULTI-PASS CELLS FOR OPTICAL APPLICATIONS

TECHNICAL FIELD

The present invention relates to a Zero-Q-Transforming multi-pass cell for optical applications, such as, but not limited to, long path spectroscopy, in optical pulse compressors, in extending the length of laser resonators, and in optical delay lines.

BACKGROUND ART

Multi-pass cells (MPCs) have been used for decades in applications where it is desirable to have an optical beam traverse a large distance in a small space. This, for example, allows a beam to travel meter length paths between mirrors separated by only a few tens of centimetres.

Initial applications of MPCs were to gas spectroscopy, where sufficient absorption would only be achieved when the path length was large. Nowadays, MPCs have additional uses, for example, to extend the lengths of laser resonators whilst maintaining a compact footprint for the system; in optical delay lines; and in optical pulse compressors for ultrafast lasers. Two main configurations of MPCs are known in the art, which include the White Cell and the Herriott Cell.

A classical White Cell uses three concave mirrors with the same radii of curvature with two smaller "objective" mirrors at one end of the cell and one larger "field" mirror at the other end of the cell, where the centre of the curvature of the field mirror is positioned in the middle between the objective mirrors. The distance between the field mirror and objective mirrors, referred to as d, is equal to their radius of curvature, r. Due to the White Cell's confocal configuration, after every two passes, i.e., after the light passes from the field mirror to an objective mirror and back again, the cell re-images the source at a different point on the field mirror which makes it suitable for highly diverging beams and non-laser sources. Appropriate alignment of the objective mirrors can be used to achieve a different number of passes through the cell. The main application of White Cells are in spectroscopic measurements of low concentration chemical compounds, where long optical paths are required.

Different to the White Cell, the Herriott Cell comprises of two concave spherical mirrors with the same radius of curvature aligned facing each other. Normally, the beam is made to enter and exit the Herriott cell either through small holes drilled in one or both of the mirrors, or by using a plurality of "skimmer" mirrors positioned appropriately to intercept the beam paths inside the cell. The number of passes through the cell is determined by the separation of the mirrors, d, and the radius of curvature of the mirrors, r.

In an exemplary embodiment of a Herriott Cell, the beam paths create a set of reflection points on each mirror that lie along the circumference of a circle, such that the adjacent reflection points advance by an angle θ along that circle after each double pass. More generally, the reflection points may fall along an ellipse (of which a circle is a special case) provided that $$0 < \frac{d}{r} < 2,$$

which defines the stability limit of such a cell. As the Herriott Cell contains fewer mirrors than the White Cell, they are preferred in many applications involving coherent beams from lasers, such as in optical delay lines, extending the length of laser resonators, or in optical pulse compressors.

The complex beam parameter, Q, is a complex number specifying the properties of a Gaussian laser beam.

This parameter Q is a related to the beam's wavelength λ, the wavefront radius of curvature R, and the electric field radius $\omega_0$ by the relationship:

$$\frac{1}{Q} = \frac{1}{R} - i\frac{\lambda}{\pi\omega_0^2} \tag{1}$$

When a Gaussian laser beam is coupled into an MPC, it generally emerges at the output with a complex beam parameter, $Q_{out}$, different from the input complex beam parameter $Q_{in}$. In other words, in general, $Q_{out} \neq Q_{in}$. The relationship between the output and input complex beam parameter is given by the ABCD ray transfer matrix of the MPC, such that:

$$Q_{out} = \frac{AQ_{in} + B}{CQ_{in} + D} \tag{2}$$

It has been demonstrated in the prior art that in specific configurations, a MPC can have $Q_{out}=Q_{in}$, provided the ray transfer matrix of the MPC satisfies the relationship:

$$\begin{bmatrix} A & B \\ C & D \end{bmatrix} = \begin{bmatrix} p & 0 \\ 0 & p \end{bmatrix}, p = 1, -1 \tag{3}$$

Such MPCs which satisfy the above relationship are known in the art as Zero-Q-Transforming (ZQT) cells.

It is known in the art that any MPC utilising mirrors can be represented as an equivalent set of cascaded lenses with focal lengths $$f = \frac{r}{2}.$$

This lens representation of an MPC makes the geometry of the system more apparent, and analysis straightforward.

An advantage of ZQT MPCs is in applications involving lasers, wherein a ZQT MPC does not change the basic properties of the beam propagating outside of the cell. For example, when the MPC is used to extend the length of the laser resonator, the cell may be bypassed or changed in length without affecting the laser beam properties provided the ZQT condition is maintained.

Embodiments of both White Cells and Herriot Cells acting as ZQT MPCs are known in the art. In the case of the White Cell, an additional curved mirror must be added to couple the light into the cell. Due to the additional complexity with a more required mirrors in the White Cell, it is much more preferred to use Herriot Cells in most applications of ZQT MPCs.

FIG. 1 illustrates an exemplary embodiment of a Herriot Cell setup with n number of passes through the cell by the beam, and its corresponding equivalent lens representation.

FIG. 2 illustrates an exemplary embodiment of an equivalent lens representation of a Herriot-type MPC, as well as the input and output reference planes. It can be assumed without loss of generalisation that a Gaussian beam travels along the axis of the optical system.

It is known in the art that ZQT Herriot-type MPCs have several important properties when applied. These include, but are not limited to the following properties.

First is the flexibility to choose the reference planes of the system. With reference to FIG. 2, FIG. 2(*a*) fulfils the requirements to be a ZQT MPC, then so is FIG. 2(*b*), provided that $d_1+d_2=d$. Hence, this allows for investigation of all properties of ZQT MPCs using the geometry in FIG. 2(*a*) without loss of generalisation.

Second is the removal of last reflection. That is, if the last reflection (or lens) is removed from the system, the system converts to a non-ZQT 1:1 telescope. That is, FIG. 2(*a*) converts to FIG. 2(*c*).

The third property is one of scalability. Namely, if there is a ZQT MPC with mirrors with radius of curvature r and separation d, then all MPCs with mirrors and radii of curvature kr and separation kd, where k is an integer, are also ZQT MPCs. Hence, implying that the condition for an MPC to be ZQT relies only on the ratio of d/r, also known as the normalised separation.

It is known in the art that for an MPC to be a ZQT cell, the choice of d/r is not arbitrary. Considering an MPC with single pass rotational angle between transits of the MPC, $\theta$, the number of passes through the cell by the beam, n, and an arbitrary integer m where $1\leq m\leq n-1$, it is shown in the prior art that ZQT conditions occur when under the condition that $n\theta=m\pi$.

Sennaroglu and Fujimoto, *Design criteria for Herriot-type multi-pass cavities for ultrashort pulses* (Optics Express, Vol 11, pp 1106-1113, 2003), have demonstrated the above ZQT conditions.

Kolev, *Long-Optical-Resonator Passively Mode-Locked Laser Prototype for Ultra-Fast Pulsed Laser Ablation and Deposition Installation* (PhD thesis, The Australian National University, 2003), demonstrates that MPCs can be classified into three different types dependent upon their m and n values.

Type 1 are referred to as "Prime Resonators", where the beam path is not closed after n round tripos.

Type 2 are referred to as "Complete Resonators", where the beam path is closed at n round trips.

Type 3 are referred to as "Impossible Resonators", where the beam path starts repeating itself before the requisite number of round trips, n, has been achieved.

The type of resonator is determined from the two numbers n, m. It is standard in the art to write their ratio in the following form.

$$\frac{n}{m} = \frac{n'}{m'} \times M \tag{4}$$

Where M is the largest common denominator of n, m.

The practical importance of M is that is shows how many times the ZQT condition is achieved when propagating through the resonator. To achieve the ZQT condition for any specific value of M, the relative separation of the mirrors, d, must be appropriately chosen. It is known in the art that the normalised separation is calculated as follows $$\frac{d}{r} = 1 - \cos\left(\pi \times \frac{m}{n}\right) \tag{5}$$

Where n=2, 3, 4, . . . ; m=1, 2, 3, . . . , (n−1).

In the prior art, Kolev demonstrates that for Prime Resonators M=1; for Complete Resonators M=2; and for Impossible Resonators M≥3.

As an example, consider a cell with n=18, m=4. From the above equation, it is found that $$\frac{d}{r} \approx 0.23396.$$

Since M=2, then this cell would be a Complete ZQT MPC.

Coupling Light in and Out of a ZQT MPC

It is known in the art of several methods for coupling light in and out of a Herriott-type MPC.

One such method involves drilling holes in the mirrors at the position of a reflection of the input and output beams. However, it is a shortcoming of this method as the ZQT condition is violated according to the second property of ZQT MPCs due to a removal of last reflection. Hence, the system converts to a 1:1 telescope imaging system.

Another such method involves placing planar mirrors on the mirror surface for injection and rejection of the beam. However, this system also reverts to a 1:1 imaging system as the last reflection is removed.

Another method involves placing two skimmer mirrors by which the beam is allowed to enter the MPC. This can result in a ZQT MPC system.

In principle, a small concave auxiliary mirror with the same radius of curvature as the primary mirrors placed at the position of one of the mirror reflections could allow an external beam to be injected whilst preserving the ZQT condition. However, in practice to do so would be mechanically very challenging especially if the radius of curvature of the mirrors is small.

Referring to FIG. 3 and FIG. 4, an exemplary embodiment of a Herriot-type system with two skimmer mirrors is illustrated. FIG. 3 is of such a system with n=9, m=2, while FIG. 4 is of such a system with n=18, m=4.

It is known in the art to place skimmer mirrors at positions of approximately 4 or 4 along the cavity where the circulating beams have the greatest separation. This system is used in the prior art to produce a Herriot-type ZQT MPC, as taught by Kolev. However, in many of the prior art, planar skimmer mirrors are placed at the end mirrors violating the ZQT.

It is a shortcoming of the prior art to position the mirrors to appropriately allow the system to fulfil the ZQT requirements. Difficulties arise as the position and the alignment of the skimmer mirrors are arbitrary in 3D space as in FIG. 4. This results in the exact position of the input and output reference planes being uncertain.

Furthermore, any inaccuracy in setting the end mirror separation to the correct values result in the output beam moving across the surface of the exit skimmer mirror making the system sensitive to both the mirror separation and the alignments of the end mirrors of the MPC as well as the alignment of the input skimmer mirror.

It is an object of the present invention to overcome or ameliorate a problem of the prior art by providing a ZQT MPC system that utilises only one skimmer mirror. The system proposed makes alignment of the cell trivial and highly tolerant of the alignment of mirrors in the MPC and skimmer mirror. This distinguishes the design from previous solutions where the ZQT condition is not achieved due to high sensitivity of the system to the alignment of the end mirrors.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect the invention comprises a Herriott-type multi-pass optical cell with a single thin auxiliary skimmer mirror.

In one embodiment of the invention, the Herriott-type multi-pass cell is Zero-Q-Transforming for an input Gaussian laser beam.

In one embodiment of the invention the Zero-Q-Transforming Herriott-type multi-pass cell is of a Complete Resonator type system, such that the beams circulating inside the cell form a closed path.

In one embodiment of the invention the skimmer mirror is located approximately ¼ or ¾ of the distance between the end mirrors along the cell.

In one embodiment of the invention the output beam emerges from the cell in the same direction and in substantially the same position as the input beam.

In one embodiment of the invention the properties of the output beam emerging from the cell are indistinguishable from the input beam.

In one embodiment of the invention the exact beam path inside the multi-pass cell does not change the position, direction or properties of the output beam.

In one embodiment of the invention the exact direction with which the skimmer mirror directs the input beam into the multi-pass cell does not affect the position, direction or properties of the output beam.

In one embodiment of the invention the correct separation of the mirrors of the multi-pass cell can be ascertained by adjusting the mirror separation until the output beam is aligned to substantially the same position and same direction defined by the input beam were the skimmer mirror to be removed.

In one embodiment of the invention the multi-pass cell is used for long path spectroscopy.

In one embodiment of the invention the multi-pass cell is used to extend the length of a laser resonator.

In one embodiment of the invention the multi-pass cell is used in an optical delay line.

In one embodiment of the invention the multi-pass cell is used in a nonlinear optical pulse compressor for ultrashort pulse lasers.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

LIST OF COMPONENTS

Figure 1:
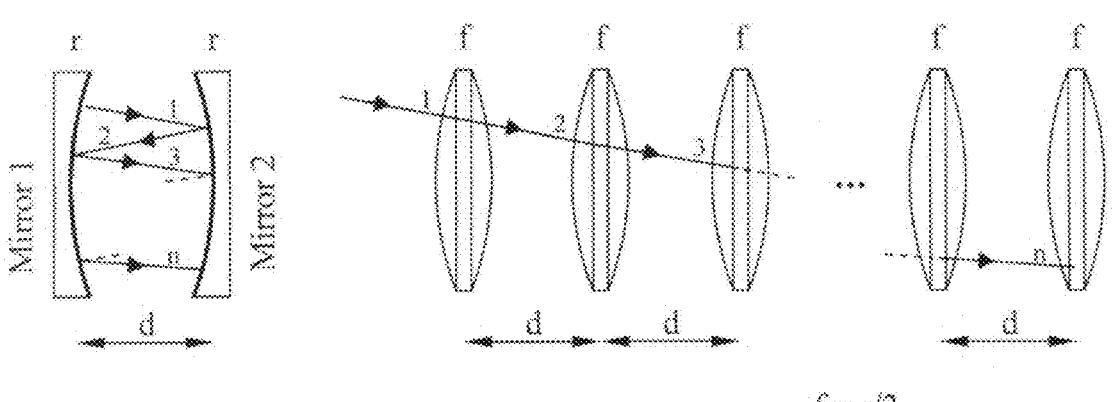
FIG. 1 is an illustration of an exemplary embodiment of a Herriot Cell and its corresponding equivalent lens representation.
Figure 2:
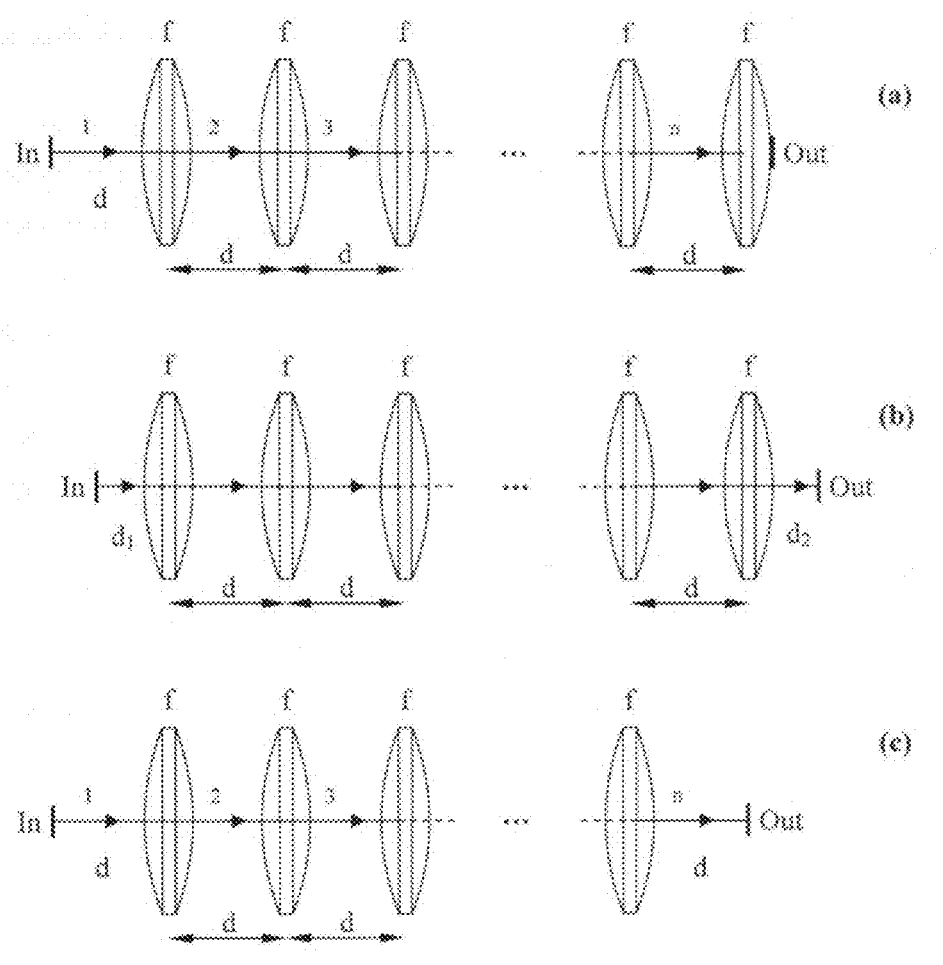
FIG. 2 is another illustration of an equivalent lens representation of an exemplary Herriot Cell.
Figure 3:
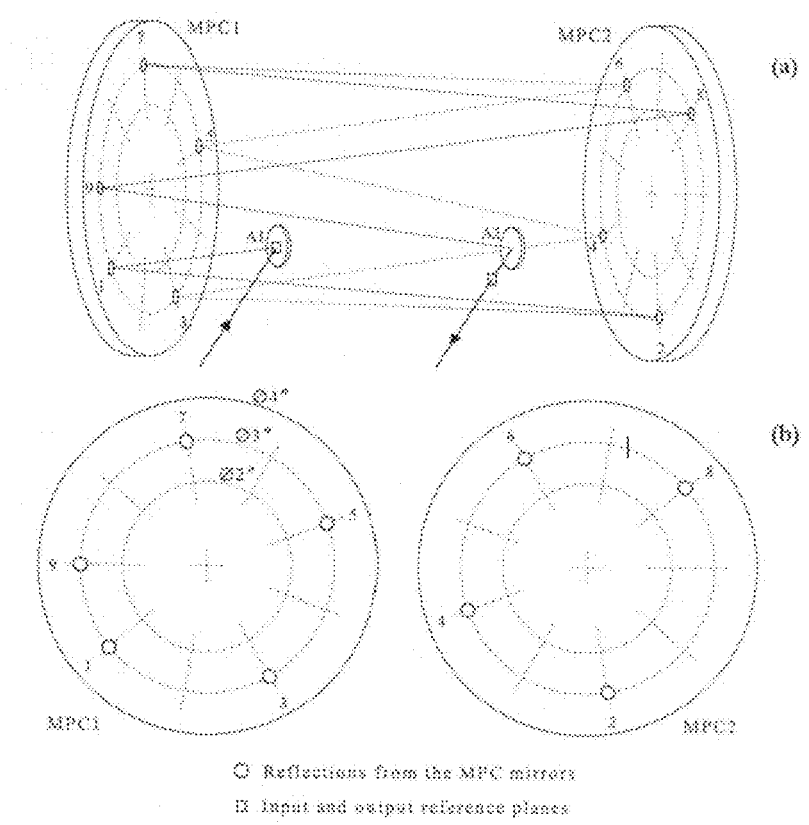
FIG. 3 is illustration of an exemplary embodiment of a Herriot Cell with n=9, m=2.
Figure 4:
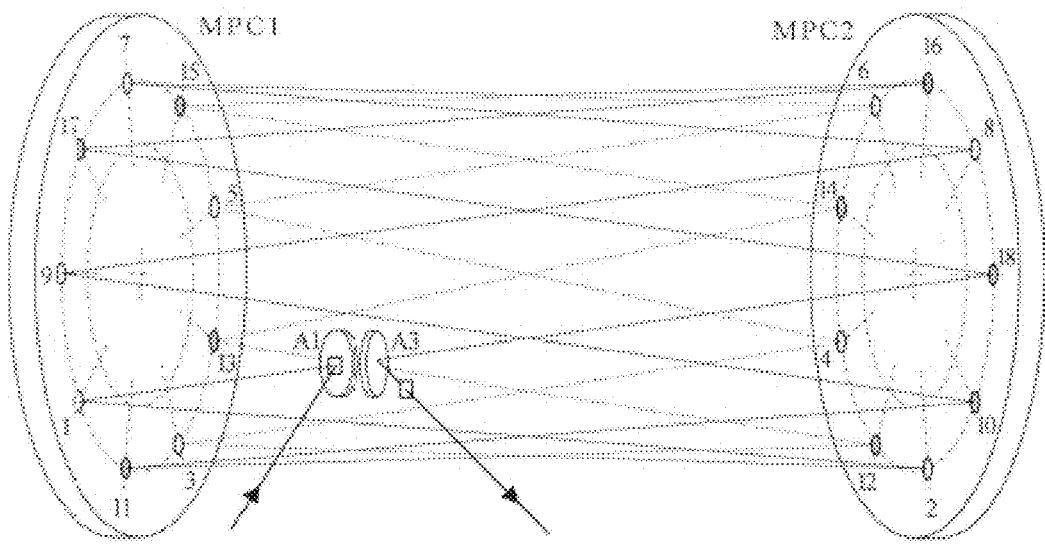
FIG. 4 is an illustration of an exemplary embodiment of a Herriot Cell with n=18, m=4.

The drawings include items labelled as follows:
20 First end mirror
22 Second end mirror
24 Skimmer mirror
26 Input beam
28 Output beam
30-48 Internal points of reflection

DETAILED DESCRIPTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

Figure 5:
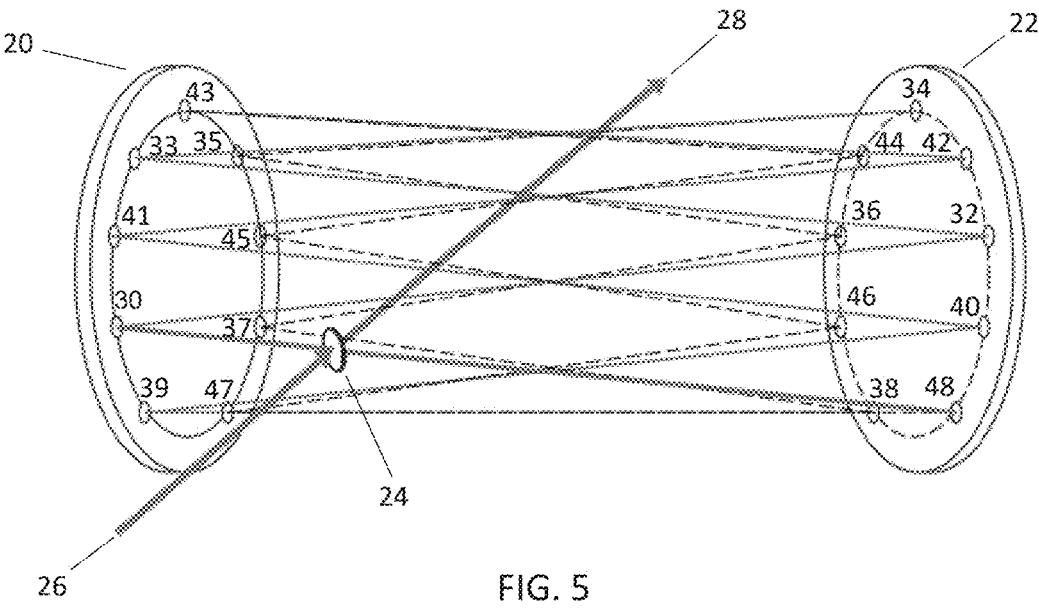
FIG. 5 is a schematic side view of the invention with a circular locus of reflection.
Figure 6:
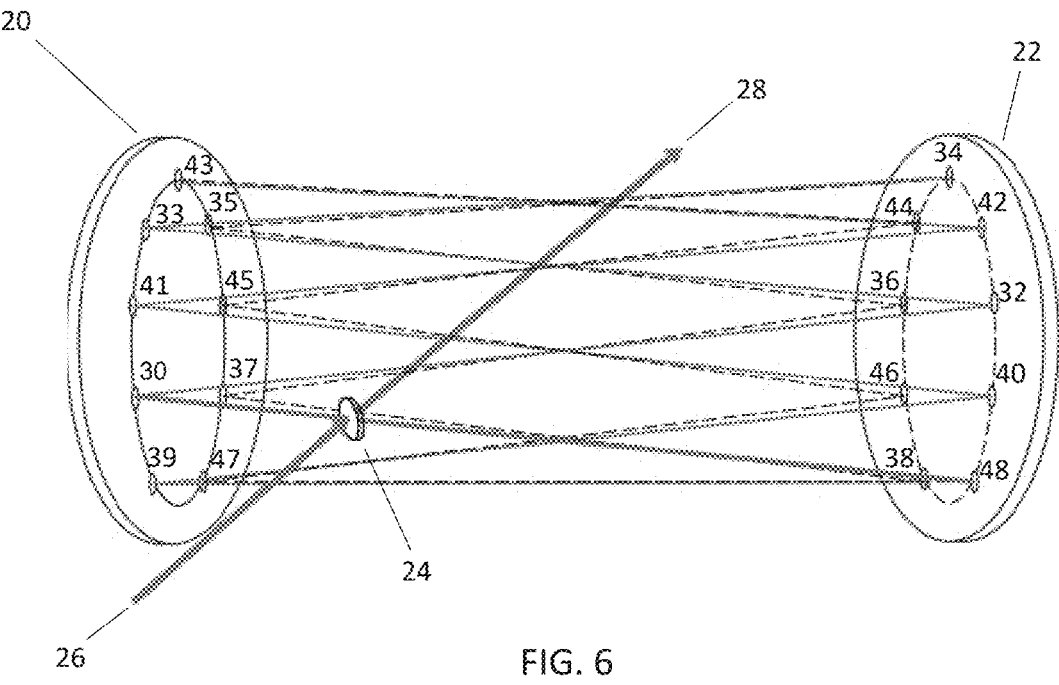
FIG. 6 is a schematic side of the invention with an elliptical locus of reflection.

The reader will now appreciate the present invention which provides a system and for a simple Zero-Q-Transforming multi-pass cell for optical applications. The MPC contains two concave spherical end mirrors 20, 22, and a single skimmer mirror 24. An input beam 26 is reflected off the skimmer mirror 24 onto an end mirror 20, wherein the beam reflects along a locus of reflection which is circular or elliptical in shape at a number of points n, which is the total number of passes of the beam through the cell. Referring to FIG. 5 and FIG. 6, the number of reflection points 30-48 and the number of passes n=18, however, the invention is not limited to cells with this number of reflection points. After the final pass through the cell, the beam reflects off of end mirror 22 from the final point of reflection 48 onto a rear surface of the skimmer mirror 24, wherein the output beam 28 exits the MPC, and the output beam 28 and input beam 26 are aligned.

The present invention discloses a Herriot-type ZQT Complete MPC with M=2. Examples of such cells are those with n=10, m=2, 4, 6, 8; or n=14; m=2, 4, 6, 8, 10, 12; n=18, m=2, 4, 6, 8, 10, 14, 16; n=22, m=2, 4, 6, 8, 10, 12, 16, 18, 20; or any other variation of n, m such that M=2.

Because the MPC is a Complete Resonator, all configurations of the beam path, whether circular (FIG. 5) or elliptical (FIG. 6) loci occur for the reflections on the end mirrors, the final pass 48 through the cell is always aligned to the position and direction of the injected beam defined by the reflection of the input beam 26 off the skimmer mirror 24. Hence, the output beam 28 position and direction remain aligned to the direction of the input beam 26, even if the direction of that input beam is varied, provided that the path inside the MPC does not move outside the aperture of the mirrors. The beam path inside the cell simply adjusts to maintain the closed path.

If the direction of the reflection off the injecting skimmer mirror 24 is changed by adjusting its alignment, the position of the output beam 28 remains aligned to that of the input beam 26. The position of the output beam is thus insensitive to the exact alignment of the end mirrors 20, 22, of the MPC. Any change in their alignment will simply change the internal beam path but does not change the direction of the final reflection from the second end mirror 22 back towards the skimmer mirror.

The Herriot-type ZQT Complete MPC as disclosed contains a single planar skimmer mirror 24, which is used to couple a Gaussian beam both into, and out of the MPC.

The skimmer mirror is positioned at approximately ¼ or ¾ of the distance along the cavity, d, wherein the separation of the circulating beams is at its greatest.

The skimmer mirror 24 may be made from a plane parallel substrate. In such an MPC, the reference input and output planes are located on the front and rear surface of the skimmer mirror respectively.

The skimmer mirror 24 may also be bidirectional, such that it has high reflectivity on both its surfaces. The high reflectivity on its front surface for the input beam 26 allows it to direct all the input power towards the first mirror 20 the MPC, whereas the high reflectivity on its rear surface allow for an output beam that approaches from the second mirror 22 from the final point of reflection 48 to be directed out of the MPC with high output power.

The skimmer mirror 24 may be made using a thin transparent substrate, with thickness on the order of $10^{-3}$ m.

In an embodiment, highly reflective coating may be applied on the front surface of the skimmer mirror 24.

In an embodiment, the rear surface of the skimmer mirror 24 may contain a highly reflective coating, or in another embodiment, an antireflection coating on its rear surface.

For the exemplary design of the MPC illustrated in FIG. 5 or 6, the output beam 28 and the input beam 26 are aligned when the end mirrors of the MPC have a d/r=0.23396 ratio. However, the invention is not limited to MPCs with this specified d/r ratio.

This invention allows for ease in setting the precise separation of the end mirrors 20, 22, by simply adjusting their separation until the output beam 28 becomes aligned down the same path as would have been travelled by the input beam 26 were the cell to be bypassed (apart from any small lateral shift of the beam caused by the finite thickness of the skimmer mirror). This direction is easily determined by temporarily removing the skimmer mirror by using beam measurement techniques known in the art.

The length of the cell is able to be varied. Using a constant M=2, it can be determined that the MPC becomes shorter as m/n becomes smaller, whereas the length of the MPC becomes longer as m/n becomes larger. The choice of the m value allow for choice in the length of the cell, allowing the present invention to be used in a wide range of optical applications. For example, shorter MPCs are preferred in nonlinear optical pulse compressors, whereas longer MPCs are more favoured for use in gas spectroscopy, due to long path lengths required.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A method for coupling light in and out of a Herriott-type multi-pass optical cell, wherein the Herriott-type multi-pass optical cell comprises a pair of end mirrors, an input Gaussian beam into the Herriott-type multi-pass optical cell, an internal beam path, an output beam out of the Herriott-type multi-pass optical cell, and a single coupling mirror:

wherein the Herriott-type multi-pass optical cell is Zero-Q-Transforming for the input Gaussian laser beam so that the Herriott-type multi-pass cell is now a Zero-Q-Transforming Herriott-type multi-pass cell, such that a phase front of the output beam has a same size and radius of curvature as the input Gaussian beam;

wherein the Zero-Q-Transforming Herriott-type multi-pass cell is of a Complete type, such that the internal beam path circulating inside the Zero-Q-Transforming Herriott-type multi-pass cell forms a closed path; and wherein the output beam emerges from the Zero-Q-Transforming Herriott-type multi-pass cell in the same direction and in substantially the same position as the input Gaussian beam.

2. The method of claim 1, wherein the coupling mirror is located approximately ¼ or ¾ of the distance between the end mirrors of the Zero-Q-Transforming Herriott-type multi-pass cell.

3. The method of claim 1, wherein the properties of the output beam emerging from the Zero-Q-Transforming Herriott-type multi-pass cell is indistinguishable from the input Gaussian beam.

4. The method of claim 1, wherein the exact beam path inside the Zero-Q-Transforming Herriott-type multi-pass cell does not change the position, direction or properties of the output beam.

5. The method of claim 1, wherein the exact direction that the coupling mirror directs the input Gaussian beam into the Zero-Q-Transforming Herriott-type multi-pass cell does not affect the position, direction or properties of the output beam.

6. The method of claim 1, further comprising the step wherein a correct separation of the end mirrors of the Zero-Q-Transforming Herriott-type multi-pass cell can be ascertained by adjusting the end mirror separation until the output beam is aligned to the direction defined by the input Gaussian beam were the coupling mirror to be removed.

7. The method of claim 1, wherein the Zero-Q-Transforming Herriott-type multi-pass cell is used for long path spectroscopy.

8. The method of claim 1, wherein the Zero-Q-Transforming Herriott-type multi-pass cell is used to extend a length of a laser resonator.

9. The method of claim 1, wherein the Zero-Q-Transforming Herriott-type multi-pass cell is used in an optical delay line.

10. The method of claim 1, wherein the Zero-Q-Transforming Herriott-type multi-pass cell is used in a nonlinear optical pulse compressor for ultrashort pulse lasers.

\*   \*   \*   \*   \*